US010761686B2

(12) United States Patent
Fang et al.

(10) Patent No.: US 10,761,686 B2
(45) Date of Patent: *Sep. 1, 2020

(54) TECHNIQUES FOR GENERATING ELECTRONIC MENU GRAPHICAL USER INTERFACE LAYOUTS FOR USE IN CONNECTION WITH ELECTRONIC DEVICES

(71) Applicant: TouchTunes Music Corporation, New York, NY (US)

(72) Inventors: Yu Fang, Los Altos Hills, CA (US); Robert R. Dykes, Los Altos Hills, CA (US)

(73) Assignee: TouchTunes Music Corporation, New York, NY (US)

( * ) Notice: Subject to any disclaimer, the term of this patent is extended or adjusted under 35 U.S.C. 154(b) by 90 days.

This patent is subject to a terminal disclaimer.

(21) Appl. No.: 15/924,816

(22) Filed: Mar. 19, 2018

(65) Prior Publication Data

US 2018/0210618 A1 Jul. 26, 2018

Related U.S. Application Data

(63) Continuation of application No. 14/535,902, filed on Nov. 7, 2014, now Pat. No. 9,921,717.

(60) Provisional application No. 61/901,400, filed on Nov. 7, 2013.

(51) Int. Cl.
*G06F 3/0482* (2013.01)

(52) U.S. Cl.
CPC ................. *G06F 3/0482* (2013.01)

(58) Field of Classification Search
CPC ...................................... G06F 3/1415
See application file for complete search history.

(56) References Cited

U.S. PATENT DOCUMENTS 9,177,314 B2 11/2015 Uzo
2005/0237321 A1 10/2005 Young et al.
(Continued)

OTHER PUBLICATIONS

Search Report and Written Opinion dated Mar. 31, 2015 in corresponding International Application No. PCT/US2014/064637.
(Continued)

*Primary Examiner* — Cao H Nguyen
(74) *Attorney, Agent, or Firm* — Nixon & Vanderhye, P.C.

(57) ABSTRACT

Certain exemplary embodiments relate to techniques for generating electronic menu (eMenu) graphical user interface layouts for use in connection with electronic devices (e.g., tablets, phablets, smart phones, etc.). A virtual grid-based layout including rows and columns that together constitute regularly sized and shaped grid cells is defined. Input identifying items to be included in the eMenu is received. Each item has associated length and width dimensions corresponding to a number of grid cells. At least some of the items are flagged for inclusion in the eMenu. Those items marked for inclusion are automatically and programmatically arranged in the eMenu in the grid cells of the grid-based layout in a manner that minimizes the number of unused grid cells. A tag-based representation of the layout corresponding to the formatted eMenu is stored. The file is made available to the electronic device in enabling the formatted eMenu to be displayed thereon.

20 Claims, 11 Drawing Sheets

(56) References Cited

U.S. PATENT DOCUMENTS

| | | | |
|---|---|---|---|
| 2007/0038727 A1* | 2/2007 | Bailey | G06Q 10/02 |
| | | | 709/219 |
| 2008/0243624 A1 | 10/2008 | Perry et al. | |
| 2010/0138780 A1* | 6/2010 | Marano | G06F 3/1415 |
| | | | 715/804 |
| 2011/0191194 A1 | 8/2011 | Lutnick et al. | |
| 2012/0284196 A1 | 11/2012 | Vilmos | |
| 2014/0089183 A1 | 3/2014 | Allen | |
| 2014/0114775 A1 | 4/2014 | Cloin | |
| 2016/0078434 A1 | 3/2016 | Huxham | |

OTHER PUBLICATIONS

International Preliminary Report for International Application No. PCT/US2014/064637 dated May 19, 2016.
Office Action in related application U.S. Appl. No. 14/481,761 dated Oct. 11, 2017.
Office Action in related application U.S. Appl. No. 15/098,871 dated Aug. 22, 2017.

* cited by examiner

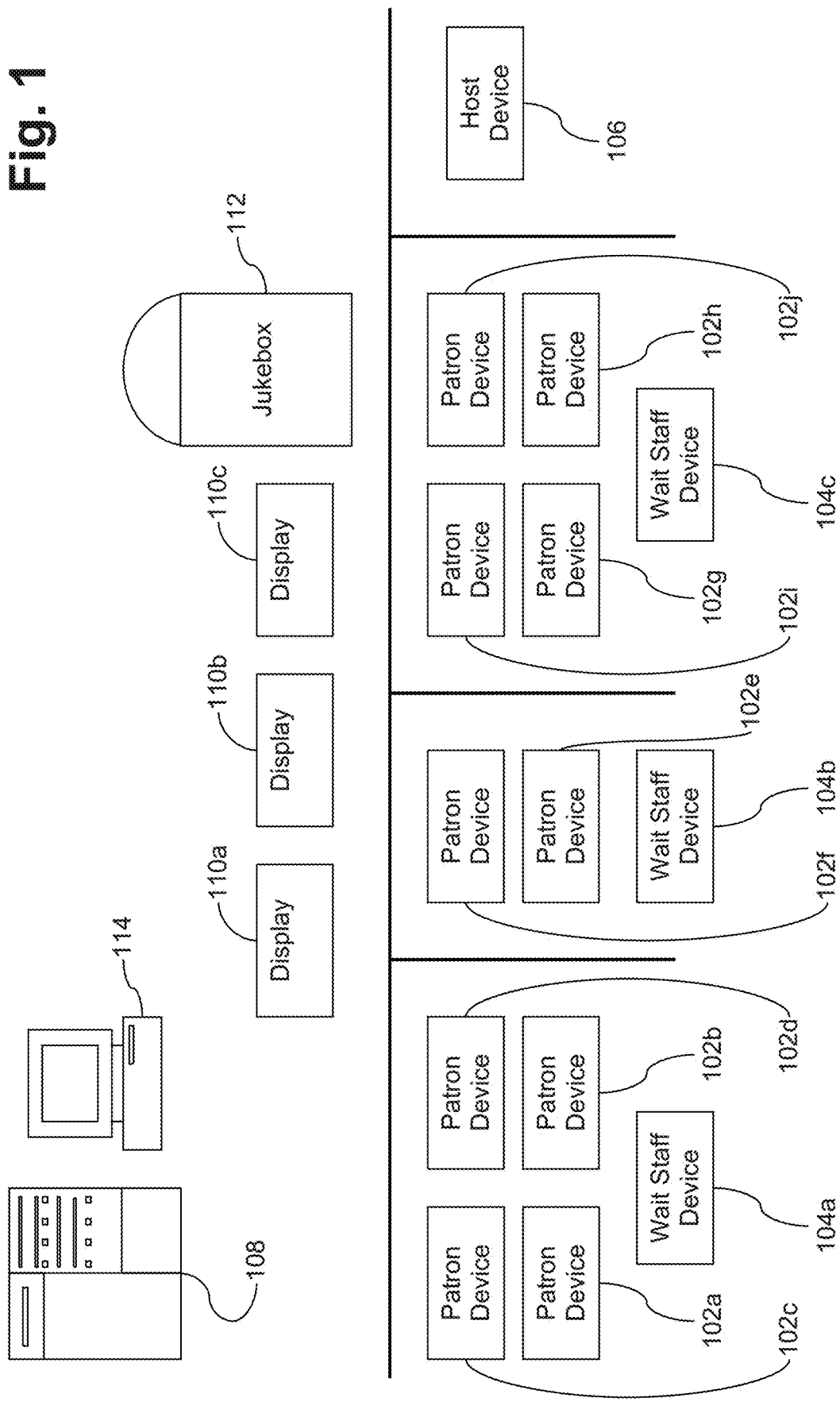

| Category | Name | Description | Full Image URL | Publish | Items In Stock | Available Days | Special | Start time | End time | Price Description | Price | Price Description | Price |
|---|---|---|---|---|---|---|---|---|---|---|---|---|---|
| Appetizers | Fried Pickles | Delicious dill pickles are batter dipped and fried until golden brown. Served with a savory mustard-based dipping sauce. | | yes | 10 | | no | | | | 7.99 | | |
| Wings | Boneless Wings | Chicken tenders with your choice of our zesty BBQ sauce or honey mustard dipping sauce. | /products/2012wings-03244.png | yes | 10 | | no | | | 6 | 7.99 | 12 | 10.99 |
| Entrees | Chicken Tenders Platter | | | yes | 10 | | no | | | | 12.49 | | |
| Sandwiches | Beef O Weck | Tender, shaved, and grilled roast beef served with grilled onions on our delicious Kummelweck roll topped with sea salt. | /products/newbeefonweck-6.png | yes | 10 | | no | | | | 9.99 | | |
| Salads Classic | Grilled Salmon Caesar Salad | Crisp, chilled romaine lettuce tossed with our Caesar dressing, oven-baked croutons. | | yes | 10 | | no | | | | 13.99 | | |
| Burgers | All American Burger | Our award-winning burger grilled to perfection. | | yes | 10 | | no | | | | 7.99 | | |
| Sides | Seasoned Fries | | | yes | 10 | | no | | | | 2.69 | | |
| Sidelines | Cornbread with Butter | | | yes | 10 | | no | | | | 3.99 | | |
| Desserts | Warm Chocolate Lava Cake | Moist and sinfully delicious chocolate cake with a molten chocolate center. Served warm with premium vanilla ice cream. | /products/lavacake-136.png | yes | 10 | | no | | | | 5.99 | | |

Fig. 6

| CATEGORY | NAME | DESCRIPTION | Image URL | Special | Featured | Start time | End time | Price Description | Price | Price Description | Price | Price Description | Price |
|---|---|---|---|---|---|---|---|---|---|---|---|---|---|
| Classic Cocktails | Top Shelf Long Island Iced Tea | Made with Kettle One Vodka, Bacardi Superior Rum, Tanqueray Gin and Cointreau. | /drinks/ltir.jpg | | | | | | | | | | |
| Bottled Beer | Michelob Ultra 4.2% | | | no | no | | | | | | | | |
| Bottled Beer | Coors Light 4.2% | | | no | no | | | | | | | | |
| Draft Beer | Guinness 4.2% | | /drinks/guinness.jpg | no | no | | | | | | | | |
| Draft Beer | Bud Light 4.2% | | | no | no | | | | | | | | |
| Wine List | White | Sauvignon Blanc - Starborough, NZ | | | no | no | | | | | | | | |
| Wine List | Red | Malbec - Alamos, Argentina | | | no | no | | | Glass | | 7.99 Bottle | 24.49 | | |
| Margaritas & Frozen Drinks | Frozen Strawberry Margarita | Our Home Run Margarita blended with strawberry puree and served frozen with a sugar rim. | | no | no | | | | | | | | |
| Margaritas & Frozen Drinks | Strawberry Daiquiri | Your choice of rum blended with strawberry puree. | /drinks/daiquiri.jpg | no | yes | | | | | | | | |
| Margaritas & Frozen Drinks | Piña Colada | Pineapple and coconut blended with your choice of rum. | | no | no | | | | | | | | |
| Non-Alcoholic | Raspberry Iced Tea | | | no | no | | | EACH | | 3.59 REFILLS | 0.99 | | |
| Non-Alcoholic | Peach Iced Tea | | | no | no | | | EACH | | 3.59 REFILLS | 0.99 | | |

Fig. 7

TECHNIQUES FOR GENERATING ELECTRONIC MENU GRAPHICAL USER INTERFACE LAYOUTS FOR USE IN CONNECTION WITH ELECTRONIC DEVICES

This application is a continuation of U.S. application Ser. No. 14/535,902 filed Nov. 7, 2014 now U.S. Pat. No. 9,921,717 (to be issued Mar. 20, 2018), which claims the benefit of U.S. Application Ser. No. 61/901,400, filed on Nov. 7, 2013, the entire contents of which are hereby incorporated by reference herein.

TECHNICAL FIELD

Certain exemplary embodiments relate to techniques for generating electronic menu (eMenu) graphical user interface (GUI) layouts for use in connection with electronic devices such as, for example, tablets, phablets, smart phones, and/or other electronic devices.

BACKGROUND AND SUMMARY

Electronic menus (eMenus) are becoming more and more popular, especially as prices for electronic devices such as tablets, phablets, smart phones, and the like, continue to drop. Some restaurants thus have made moves to make their current physical menus available via custom applications (apps) that run on such electronic devices.

Unfortunately, however, the process of turning a physical "paper" or other menu into an electronic version can be complicated. For instance, although patrons typically tolerate a large amount of so-called "negative space" (e.g., large areas of unused or "wasted" space where a simple white or other oftentimes neutral color background appears behind text and/or images) when it comes to physical "paper" or other menus, electronic device users typically want to have more visually interesting "worlds" in which they can navigate and explore. Thus, a simple conversion from a paper menu to an electronic version, without more, can result in a graphical user interface (GUI) that is generally unsuitable for an electronic device because of the presence of too much "boring" negative space. As another example, although it is relatively easy to flip through a multi-page physical menu, navigating through a simple electronic analog (e.g., via scrolling or the like) could be quite tedious. Even where "electronic pages" can be "turned" by a user operating an electronic device, simply listing menu items through a series of text entries still leaves a large amount of wasted negative space and can create a fairly boring user experience. Thus, although the content may remain the same as between a conventional physical menu and an eMenu, it may be desirable to change the form of the information, e.g., to make it more appropriate for the device being used.

The process of generating an eMenu may also require special programming expertise that a restaurateur may not possess. Menu creation therefore may be difficult from a technical standpoint. Even in situations where restaurateurs are able to create eMenus, the process of laying out an eMenu for electronic device can be quite different from laying out a paper menu, and may involve a different skill set, e.g., as digital creation is different from paper layout presentation. It is fairly rare to find a person who has both technical programming skills and "an eye" for how graphics and/or other layout approaches can enhance how menus and/or menu items are presented. It thus will be appreciated that it would be desirable to help merge the content creation and formatting processes, e.g., to create an accessible, cohesive, and visually interesting eMenu.

Hardcoded eMenu solutions tend to be costly and promote stagnation of menus, e.g., as the customizations and updates generally carry further costs. In such cases, it oftentimes is difficult to highlight "featured" menu items that change on a daily, weekly, monthly, or other basis. It also can be difficult to remove entries that are no longer offered. Considering that a restaurateur could easily provide a "menu insert" to highlight featured menu items or "line through" or otherwise delete and reprint no longer offered items when working in the physical (e.g., paper) world, current eMenuing systems in some senses actually create new challenges. This is an interesting trend, as most people view technology as an expedient for pushing out new content quickly and easily. It thus will be appreciated that it would be desirable to provide approaches that help keep menus fresh and up to date, both in terms of their content and their look-and-feel. Certain exemplary embodiments address these and/or other issues, e.g., by providing techniques for more automated eMenu generation and/or management.

In certain example embodiments, a method of formatting an electronic menu to be output to a display of an electronic device is provided. There is defined a virtual grid-based layout including rows and columns that together define a plurality of regularly sized and shaped grid cells. Input identifying a plurality of items to be included in the electronic menu is received, with each said item having associated length and width dimensions corresponding to a number of grid cells, and with at least some of said items being flagged for inclusion in the electronic menu. Those items marked for inclusion in the electronic menu are automatically and programmatically arranged in the grid cells of the grid-based layout in a manner that minimizes the number of unused grid cells. A tag-based representation of the layout is stored to a file on a non-transitory computer readable storage medium, following said arranging, with the tag-based representation of the layout corresponding to the formatted electronic menu. The file is made available to the electronic device in enabling the formatted electronic menu to be displayed on the display of the electronic device.

In certain example embodiments, a method of formatting an electronic menu to be output to a display of an electronic device is provided. There is defined a virtual grid-based layout including rows and columns that together define a plurality of regularly sized and shaped grid cells. Input from a predefined file corresponding to a physical menu is received, with the received input identifying a plurality of items to be included in the electronic menu, with each said item having associated length and width dimensions corresponding to a number of grid cells, and with at least some of said items being flagged for inclusion in the electronic menu. Using at least one processor of a computing system, those items marked for inclusion in the electronic menu are automatically and programmatically virtually arranged in the grid cells of the grid-based layout in a manner that minimizes the number of unused grid cells. A representation of the layout is stored to a file on a non-transitory computer readable storage medium of the computing system following said arranging, with the representation of the layout corresponding to the formatted electronic menu. The file is published so that the file is made available over a network interface of the computing device to the electronic device in enabling the formatted electronic menu to be displayed on the display of the electronic device.

In certain example embodiments, a computing device is provided. The computing device includes processing resources including at least one processor and a memory; a non-transitory computer readable storage medium; and an input channel configured to receive input identifying a plurality of items to be included in an electronic menu, each said item having associated length and width dimensions corresponding to a number of grid cells, at least some of said items being flagged for inclusion in the electronic menu. The processing resources are controllable to format the electronic menu using received input by executing instructions for at least: defining a virtual grid-based layout including rows and columns that together define a plurality of regularly sized and shaped grid cells; automatically and programmatically arranging those items marked for inclusion in the electronic menu in the grid cells of the grid-based layout in a manner that minimizes the number of unused grid cells; storing, to a file on the non-transitory computer readable storage medium, a tag-based representation of the layout, following said arranging, the tag-based representation of the layout corresponding to the formatted electronic menu; and making the file available to electronic devices in order to in turn enable the electronic devices to display and enable user interaction with the formatted electronic menu.

Similarly, in certain example embodiments, there is provided a program and/or a non-transitory computer readable storage medium tangibly storing instructions that, when executed, perform the above-described and/or other methods.

Similarly, in certain example embodiments, there is provided a system for use at a venue, with the system comprising a plurality of electronic devices distributed to patrons on behalf of the venue, and with each said electronic device being configured to display an electronic menu formatted in accordance with the method of claim 1.

According to certain example embodiments, the arranging comprises: adding to a source set a representation of each of the items identified by the received input; defining a state object having a predetermined number of rows and a number of columns equal to the number of columns in the grid-based layout that together define a plurality of state object cells, the state object cells having the same size and shape as the grid cells; (a) determining how many state object cells are unused in the first row of the state object; (b) removing elements from the source set and adding the removed elements to an insertion set while the total width of the elements added to the insertion set, as measured in cells, is less than the number of unused cells in the first row of the state object; (c) attempting to reorder the elements in the insertion set to fill the unused cells in the first row of the state object; (d) in response to a valid order being determined in (c), placing the reordered elements in the state object in this reordered order until all unused cells are filled and returning to the source set in their initial order any unused elements remaining in the insertion set; (e) in response to no valid order being determined in (c), searching for an appropriately-sized element from among the first predetermined number of elements in the source set; (f) in response to an appropriately-sized element being found in (e), removing the appropriately-sized element from the source set and adding it to the insertion set, reordering the elements in the insertion set to fill the unused cells in the first row of the state object, and placing the reordered elements in the state object in this reordered order until all unused cells are filled and returning to the source set in their initial order any unused elements remaining in the insertion set; and (g) if the source set is not empty, designating the row following the first row of the state object as the new first row of the state object and repeating (a)-(f), but otherwise defining the grid-based layout in accordance with the state object.

According to certain example embodiments, the arranging comprises: adding to a source set a representation of each of the items identified by the received input, the elements in the source set being ordered in accordance with a desired display order for the corresponding items; dividing the grid-based layout into a plurality of segments, each said segment including at least two rows and all columns in these rows that together define segment cells; (a) starting with the first segment, and starting at the beginning of the source set, identifying elements in the source set whose total cell space is less than or equal to the number of cells in the segment, and removing those identified elements from the source set; (b) selecting a segment layout from a pre-generated set of possible segment layouts for the identified elements, based on the combination of dimensions of the items associated with identified elements, as represented in cells; (c) laying out the items in the first segment in accordance with the selected segment layout; and (d) if the source set is not empty, designating the segment following the first segment as the new first segment and repeating (a)-(c), but otherwise defining the grid-based layout in accordance with the laid-out segments.

According to certain example embodiments, the arranging comprises: adding to a source set a representation of each of the items identified by the received input, the elements in the source set being ordered in accordance with a desired display order for the corresponding items; dividing the grid-based layout into a plurality of segments, each said segment including a number of rows that is at least one row greater than a maximum size of the elements, as expressed in cells, and all columns in these rows, so that the segment rows and segment columns collectively define segment cells; (a) starting with a first segment, determining how many segment cells are unused in its last row and, in response to a determination that there are no unused segment cells in its last row, adding the first segment to the grid-based layout and making the next segment the first segment; (b) starting with the first segment, and starting at the beginning of the source set, identifying elements in the source set whose total cell space is less than or equal to the number of unused cells in the first row of the first segment, and removing those identified elements from the source set; (c) attempting to first reorder and if necessary then rotate at least some of the identified elements to fill the unused cells in the first row of the first segment; (d) in response to a successful attempt in (c), placing the reordered and/or rotated elements in the first segment in this reordered and/or rotated order and returning to the source set in their initial order any unplaced identified elements; (e) in response to an unsuccessful attempt in (c), searching the source set for an element from among the first predetermined number of elements in the source set that is appropriately-sized and/or re-orientatable to be appropriately-sized to fill unused cells in the first row of the first segment; (f) in response to an appropriately-sized and/or re-orientatable element being found in (e), removing the appropriately-sized element from the source set and considering it one of the identified elements, attempting to first reorder and if necessary then rotate at least some of the identified elements to fill the unused cells in the first row of the first segment, placing the reordered and/or rotated elements in the first segment in this reordered and/or rotated order and returning to the source set in their initial order any unplaced identified elements; and (g) if the source set is not empty, designating the row following the first row of the first segment as the new first row of the first segment and repeating (a)-(f), but otherwise defining the grid-based layout in accordance with the first segment.

The exemplary embodiments, aspects, and advantages disclosed herein may be provided in any suitable combination or sub-combination to achieve yet further exemplary embodiments.

BRIEF DESCRIPTION OF THE DRAWINGS

These and other features, aspects, and advantages of the instant invention will be further understood by review of the following detailed description of the exemplary embodiments when read in conjunction with the appended drawings, in which:

FIG. 1 is a block diagram showing elements that may exist in a restaurant in which an eMenu made in accordance with certain exemplary embodiments may be used;

FIG. 6 is an example category table that may be used in certain exemplary embodiments;

FIG. 7 is an example products table that may be used in certain exemplary embodiments;

DETAILED DESCRIPTION

Figure 2A:
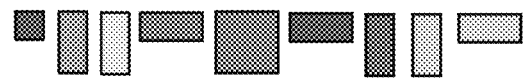
FIGS. 2a-2i help demonstrate an example technique for creating an eMenu in accordance with certain exemplary embodiments.

Certain exemplary embodiments relate to techniques for generating electronic menu (eMenu) graphical user interface (GUI) layouts for use in connection with electronic devices such as, for example, tablets, phablets, smart phones, and/or other electronic devices.

Referring now more particularly to the drawings, FIG. 1 is a block diagram showing elements that may exist in a restaurant in which an eMenu made in accordance with certain exemplary embodiments may be used. Many patron-operable devices 102a-102j are shown in FIG. 1. In the FIG. 1 example, the patron-operable devices 102a-102j are grouped such that each member in a party has his or her own patron-operable device 102. As indicated above, the individual devices may be tablets, phablets, smart phones, and/or other electronic devices. The devices may be the same or different device types in different implementations, and they may be the patrons' own devices (e.g., onto which a suitable eMenu application has been downloaded and installed), devices provided by the restaurant and loaned to the patrons (e.g., onto which the same or similar suitable eMenu application has been downloaded and installed), or a mixture of the two. The patrons may use the patron-operable devices 102a-102j to browse an eMenu made in accordance with certain exemplary embodiments, place orders, call a staff member (e.g., with a predefined message such as, fore example, "ready to order," "please bring refills," "napkins needed", "check please", etc.; a custom message; and/or as a general matter without a specific message), play single or multi-player games (e.g., table-wide, restaurant-wide, and/or broader-scale games such as trivia), control a television or other display provided at table or elsewhere, interact with a jukebox, and/or interact with other entertainment offerings. Patron-operable devices may be distributed to patrons prior to their being seated for use in the location, e.g., for ordering drinks from a bar, playing games, receiving notifications when a table is ready, checking on estimated wait times and/or location in a queue, etc.

Wait staff who serve the patrons may have their own wait staff devices 104a-104c. Wait staff operable devices 104a-104c may be used to place orders on behalf of patrons, confirm patrons' orders, etc. A host-operable device 106, which may run the same or similar application as the wait staff operable devices 104a-104c, also may be provided. These devices may also provide waitlist information, generate estimated wait times, etc.

In certain exemplary embodiments, the wait staff operable devices 104a-104c and/or the host-operable device 106 may be phablets or smaller tablets, e.g., to facilitate mobility, whereas the patron-operable devices 102a-102j may be larger tablets or the like.

A local server 108 is provided in the location, e.g., to provide content caching (e.g., useful in the administration of local games such as trivia), coordination of media output to the displays 110a-110c, distribution of newly downloaded music to the jukebox 112, generate backups of orders and/or other onsite information, etc. The local server 108 thus may have a connection to the Internet and/or another outside network.

In addition to or in place of the local server 108, certain exemplary embodiments may incorporate a management computer 114. The management computer 114 and/or the local server 108 may receive orders from the wait staff operable devices 104a-104c and/or the patron-operable devices 102a-102j (e.g., depending on the implementation in terms of who is allowed to place orders). It also may relay orders to kitchen staff, manage notifications to wait staff when orders are ready, generate bills, etc. The management computer 114 may also administer the waitlist, potentially keeping track of when parties are seated, how long parties remain seated on average and/or in accordance with a general rule defined by the location and/or an outside party, etc. The host-operable device 106, the wait staff operable devices 104a-104c, and/or the patron-operable devices 102a-102j may be able to access this waitlist information, e.g., as indicated above. The local server 108 may backup this and/or other related information in certain exemplary embodiments.

The displays 110a-110c may be televisions or other professional displays and, as such, may receive video feeds from cable boxes, satellite receivers, streaming network sources over IP, and/or the like. As alluded to above, the displays 110a-110c may be managed by the local server 108 and/or the management computer 114.

The jukebox 112 may be a digital downloading jukebox or the like. See, for example, U.S. Publication No. 2013/0070093, the entire contents of which are hereby incorporated herein by reference. As alluded to above, the jukebox 112 may be interacted with and/or at least partially controlled by host-operable device 106, the wait staff operable devices 104a-104c, and/or the patron-operable devices 102a-102j.

In terms of generating an eMenu, the inventors of the instant application have realized that a grid-based approach to locating items can be beneficial when it comes to laying out items in a cohesive and visually interesting manner. The grid-based approach also advantageously facilitates automation when it comes to eMenu generation, thereby reducing the need for custom programming and enabling more dynamic menu generation that, in turn, can be helpful when a restaurant wishes to change which items are featured, add items to and/or remove items from a menu, etc. In the examples that follow, the display on each tablet is divided into a grid with four columns and three rows when horizontally oriented. This provides 12 cells total, and menu items may take up one or more cells, depending on a variety of factors. For instance, a menu item that includes text and an image may be a 2×1 or 1×2 entry on the eMenu. A highlighted or otherwise featured menu item may be a 2×2 entry on the eMenu. Other items (e.g., basic graphics and/or items with text but lacking images) may be 1×1 entries on the eMenu. Navigational components also may be provided, e.g., to browse between breakfast, dinner, lunch, and/or other "sub-menus", to move between the eMenu itself and other entertainment-related and/or other features provided on the device (such as, for example, jukebox control, game play, etc.).

Several specific approaches for automatically generating eMenus are set forth below. In general, these approaches receive input that includes structural information about the main sections of a menu and, optionally, one or more hierarchically arranged sub-sections, of that menu. In addition to this structural information, content information is provided. The content information may include, for example, an identifier of the items (e.g., an appetizer's name), whether there is an associated image (and if so, a filename and/or pathname indicating where the image is located), a flag for whether the item is featured (optionally with information concerning how long it is to be featured), pricing information, etc. These pieces are fit together in the grid to, among other things, main structural information and reduce the "lost space" in the menu. Certain exemplary embodiments may attempt to follow the order of the layout as closely as possible, e.g., to preserve the layout of the prior menu. However, adjustments may be made to reduce wasted space, etc., in certain exemplary embodiments, and this may adjust the ordering of certain elements. It also is noted that items may be shuffled, potentially at random, e.g., to expose users to different items.

Once the layout is determined, it may be stored to a file in a format readable by applications running on the patron-operable devices, e.g., so that they can display the eMenu. In certain exemplary embodiments, a tag-based and/or other format may be used. For instance, an XML file, JSON file, and/or the like, that conforms to a predefined schema may be read by applications running on the patron-operable devices and used to generate the displays accordingly. The devices may store the layout file locally or retrieve it from a network location (e.g., from a local server, management computer, and/or other location). Central storage and/or distribution may help promote changeability over time. The devices similarly may access the content referenced in the layout file from a local or more centralized location (e.g., from a local server, management computer, and/or other location). It is noted that layout files may be generated for different orientations (horizontal vs. vertical), different device types (e.g., such that more cells are provided for devices with larger displays as compared to devices with smaller displays, etc.). The application running on the devices may determine orientation (e.g., using accelerometers, gyroscopes, and/or the like), device type and/or hardware components, etc., and access the appropriate layout file(s).

A more detailed description of three example approaches for laying out menu items will now be provided. It will, of course, be appreciated that these and/or other approaches may be used in connection with different exemplary embodiments. It is noted that the approaches may be implemented as instructions stored on a non-transitory computer readable storage medium. Such instructions may read a source menu file and produce an output file in a specified format, e.g., after the instructions have been performed by at least one processor of a suitably configured computer system.

First Example Layout Approach

The first example layout approach assumes that items are to be placed on a device's display, with as little empty space as reasonably possible while still maintaining the general order of the menu items. More particularly, assumptions are made that menu items are organized in categories and sub-categories, and that menu items within sub-categories should be displayed in the order that is provided. This also approach assumes a four column layout, implying that each row on a display contains four cells. As indicated above, elements can be 1×1 (e.g., for items without pictures and/or for items that are only pictures), 1×2 and 2×1 elements (e.g., for items with pictures, respectively organized side-by-side and stacked vertically), and 2×2 items (e.g., for items associated with a promotion, that are featured, etc.).

The approach also maintains a state object, which describes the current state of the layout. The state object in this example contains information about which cells are available in the "first row."

The first example layout approach is iterative. For each iteration, the approach:

Obtains information about available cells from state object, including determining how many cells are available in the "first row."

Adds to a set elements from a source menu item list while the total width of the elements added is less than the number of available cells.

Attempts to reorder the elements in the set to fill available (or "empty") cells. If such an order exists, the elements are placed into the layout using this order. All unused items in the set are returned to the beginning of the source list according to their initial order.

Searches for an appropriately-sized element with the first predetermined number of elements (e.g., the first 3, 5, or other number of elements) in the source list, if such an order was not found to exist in the prior point. If such an element exists, it is added to the set and an order for the new set is selected. The elements are placed into the layout using this order. All unused items in the set are returned to the beginning of the source list according to their initial order.

If there are no suitable elements, an empty space is left. Filler material (e.g., a stock image, background, and/or the like) optionally may be inserted into the area.

Figure 2B:
Figure 2C:
Figure 2D:
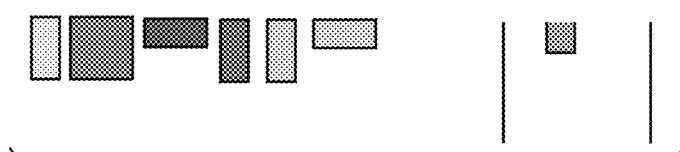
Figure 2E:
Figure 2F:
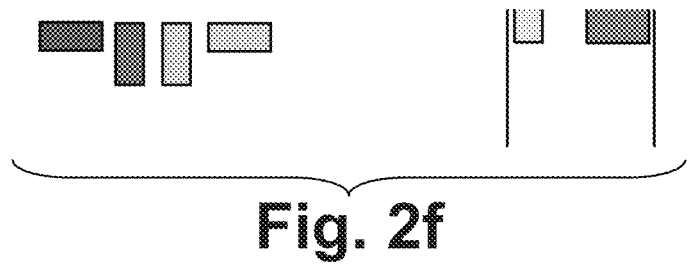
Figure 2G:
Figure 2H:
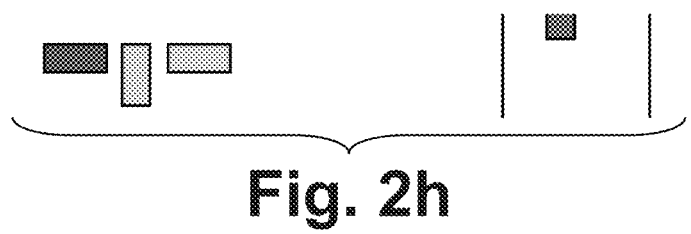
Figure 2I:
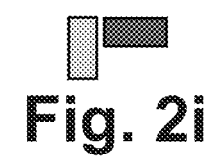
Figure 3:
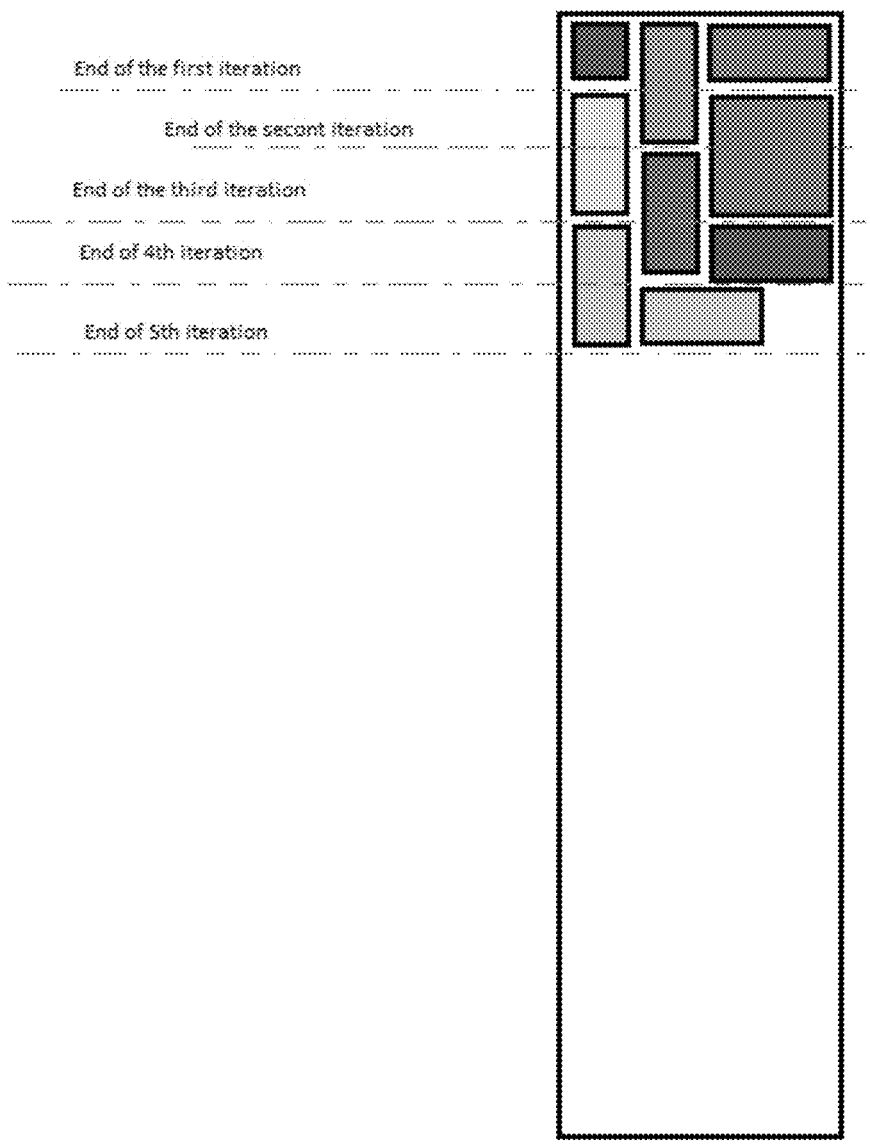
FIG. 3 is an illustrative timeline that helps demonstrate the example approach shown in and described in connection with FIGS. 2a-2i.

FIGS. 2a-2i help demonstrate an example technique for creating an eMenu in accordance with certain exemplary embodiments, and FIG. 3 is an illustrative timeline that helps demonstrate the example approach shown in and described in connection with FIGS. 2a-2i. FIG. 2a shows nine elements to be included in an eMenu. Moving from left to right, FIG. 2a shows 1×1, 2×1, 2×1, 1×2, 2×2, 1×2, 2×1, 2×1, and 1×2 items. Initially, four cells in the first row are available (the state object is completely empty), so the first elements are taken from the source list while the total width is less than four. Because of the way the loop is structured, the first four elements are taken, as shown in FIG. 2b. Because the total width is more than the number of available cells (e.g., 5>4), an attempt is made to reorder the elements to fill the row. The set shown in FIG. 2c (including elements 1, 2, and 4) thus is taken. The unused element (element 3) is returned to the beginning of the source list. The reordered elements are added to the layout. At this point, the first row is filled and therefore is no longer needs to be considered. The second row in the eMenu thus is treated as the first row, and the end of the first iteration is reached. See FIG. 2 for the eMenu layout at the end of the first iteration.

At the beginning of the second iteration, the six elements shown at the left of FIG. 2d remain and the state object shown at the right of FIG. 2d indicates that the second cell in the first row is filled. Thus, there are three empty cells in the first row and, as shown in FIG. 2e, the first two elements from the source list are taken. The total width is equal to the amount of empty cells. Furthermore, there is no need to reorder the elements, as the 2×1 entry will fit in the leftmost empty cell, and the 2×2 entry will fit in the two farthest right empty cells. The second iteration thus is ended. See FIG. 3 for the eMenu layout at the end of the second iteration.

At the beginning of the third iteration, the four elements shown at the left of FIG. 2f remain and the state object shown at the right of FIG. 2f indicates that the first, third, and fourth cells in the first row are filled. One cell needs to be filled. At this point, the element shown in FIG. 2g is taken. This set (with one 1×2 element) cannot be reordered in a manner to make it fit in the empty cell. Thus, a search is performed within a predetermined number of elements (e.g., 3) in the source list. The second element in the source list is determined to be suitable, and it then is used to fill the empty cell. The element that cannot be used is placed at the beginning of the source list. The end of the third iteration is reached. See FIG. 2 for the eMenu layout at the end of the third iteration.

At the beginning of the fourth iteration, the four elements shown at the left of FIG. 2h remain and the state object shown at the right of FIG. 2h indicates that only the second cell is filled. Thus, the first, third, and fourth cells in the first row are empty and can be filled. The first two elements from the list are taken and reordered in the manner shown in FIG. 2i. These elements are then added to the eMenu. The end of the fourth iteration is reached. See FIG. 2 for the eMenu layout at the end of the fourth iteration.

Only one element remains at this time, and it is inserted into the eMenu in the left-most empty spaces. The end of the fifth iteration is reached. See FIG. 3 for the eMenu layout at the end of the fifth iteration.

It will be appreciated from FIG. 3 that there are no empty spaces, aside from the very last cell in the bottommost and rightmost corner.

In certain exemplary embodiments, checks may be performed to make sure that difficult to place items are not shifted more than a threshold number of times. Doing so could result in the specific menu item being forced into a location far outside of its expected and/or most "natural" location. Some inefficiency in spacing thus may be tolerated.

Second Example Layout Approach

A similar set of assumptions as those discussed above in connection with the first example layout approach applies here, as well. However, in certain exemplary embodiments, an additional assumption may be made concerning two-cell items. More particularly, in certain exemplary embodiments, an assumption may be made that if an item has a picture, it can be displayed either as a 1×2 or a 2×1 element. Thus, in this example approach, the number of cells occupied is deemed more important than the orientation (e.g., unless a preferred or required orientation is specified).

The second example layout approach involves a segment-based approach. In the segment based approach:

The display area for laying out the menu items is divided into segments. For this example, each segment is a 2×4 (2 row by 4 column) segment. It is noted, however, that differently-sized segments may be used in different exemplary embodiments.

A layout is generated for each segment, one at a time, starting from the top of each sub-category. As implied above, each menu item will take up either one, two (horizontally or vertically oriented), or four (2×2) cells.

In the segment layout approach:

All possible ways for laying out any combination of menu items are pre-generated. For example, for the 2×4 segment example contemplated herein, There is only one possible layout for eight single-cell items;

There are four possible layouts for four two-cell items; and

There are two possible layouts for two four-cell items.

It is, however, noted that other use cases are contemplated herein (e.g., for a scenario where there is one four-cell item, one two-cell item, two one-cell items; etc.).

The menu items are sorted by their desired display order.

Starting from the top of sorted menu item list, a search is performed to find the first few items whose total cell space adds up to a number less than or equal to eight (e.g., such that if the number of less than 8, it is the closest it can be without going over and/or optionally while retaining the desired order).

The pre-generated layouts for this combination of menu items are recalled.

Of the recalled pre-generated layout(s), one is selected (e.g., at random, in a predetermined order, by a user, and/or in some other manner).

The items are laid out in accordance with the selected recalled pre-generated layout.

This process is repeated, moving down the list, until all menu items are placed.

If there is an empty space in a segment, a filler image and/or the like may be used. It is noted that this may be performed in line and/or at the end of the process.

This approach advantageously is very extensible. It is noted, for example, that the segment size can be changed. In certain exemplary embodiments, different segment sizes can be used simultaneously for displaying one menu. In a similar vein, the menu item sizes can vary.

Certain exemplary embodiments may incorporate further enhancements. For example, at the end of a menu item list, if the total space of the items left is less than or equal to four, remaining elements may be placed in a single row. As another example, different weights can be given to different layouts for one combination of menu items, e.g., so that one or more of them are preferred over others.

Third Example Layout Approach

The third example layout approach in essence combines aspects of the two previously discussed approaches. That is, it fills a container segment-by-segment, like the second approach discussed above, and each segment is filled rowby-row and left-to-right like the first approach. For this example, the initial segment size is three rows by four columns. Furthermore, this approach attempts to rotate elements, e.g., in order to try to fill each row as fully as possible. The iterative approach in this example is similar to the iterations performed in the first example approach discussed in detail above. For each iteration in this approach:

If the previous "last row" was filled completely, it is considered that a new empty segment and a new "first row" should be filled.

Information about the number of available cells in the first row is obtained from the state object.

Several elements are taken from the source menu items list while the total width of these elements is less than the number of available cells.

If the set of taken elements cannot be inserted into the first row, an attempt is made to rotate some of the elements to arrive at a suitable combination. If such a combination exists, the elements that fit are placed into the layout. All unused items are returned to the beginning of the source list according to their initial order.

If there is no suitable combination, an attempt is made to reorder and rotate any of the elements to fill the empty cells. If such a combination exists, the elements that fit are placed into the element. All unused items are returned to the beginning of the source list according to their initial order.

If no elements were inserted, a search is made for an appropriately-sized element with the first predetermined number of elements (e.g., the first 3, 5, or other number of elements) in the source list. Attempts to rotate and/or reorder elements in the new set of menu items are made so that a fit is found. If there is a combination that fits, the items are placed in the layout. All unused items in the set are returned to the beginning of the source list according to their initial order.

If there are no suitable combinations, an empty space is left. Filler material (e.g., a stock image, background, and/or the like) optionally may be inserted into the area.

Figure 4A:
FIGS. 4a-4g help demonstrate another example technique for creating an eMenu in accordance with certain exemplary embodiments.
Figure 4B:
Figure 4C:
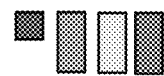
Figure 4D:
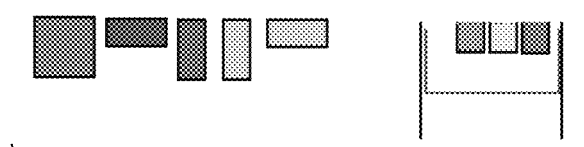
Figure 4E:
Figure 4F:
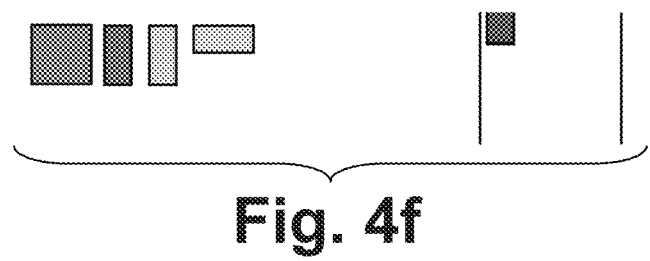
Figure 4G:
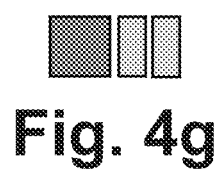
Figure 5:
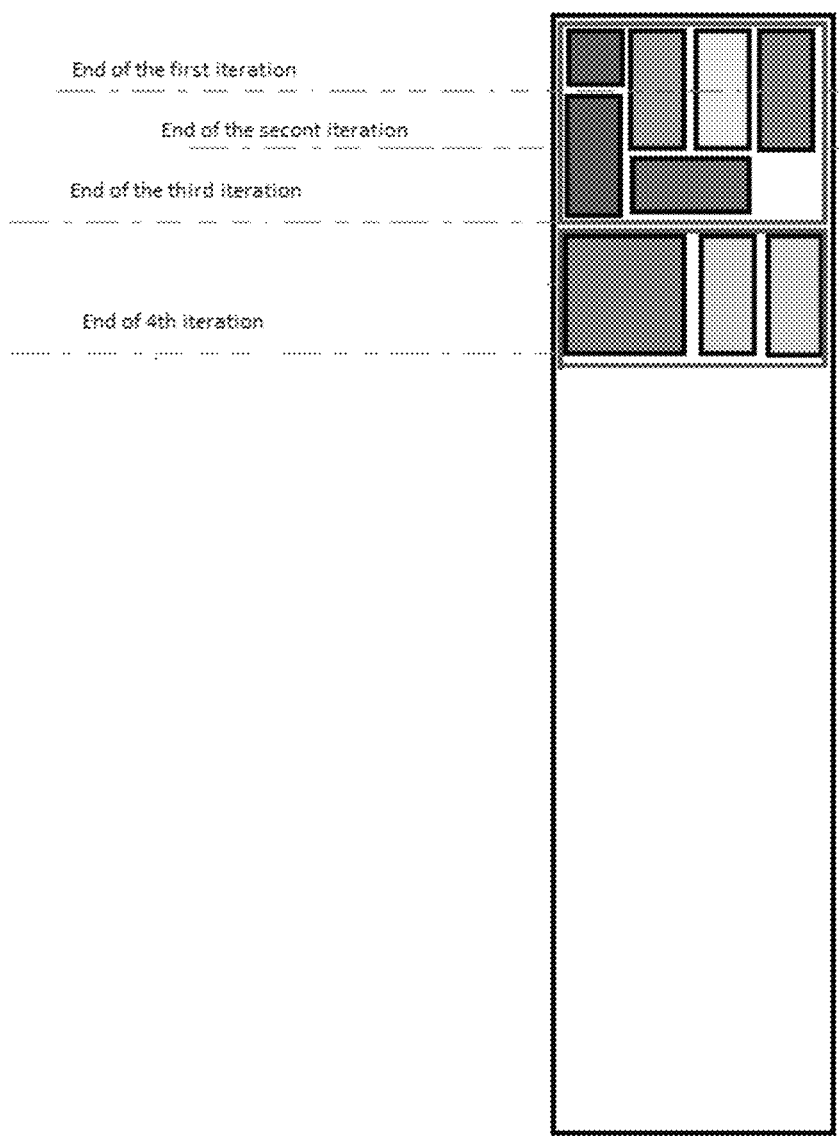
FIG. 5 is another illustrative timeline that helps demonstrate the example approach shown in and described in connection with FIGS. 4a-4g.

FIGS. 4a-4g help demonstrate another example technique for creating an eMenu in accordance with certain exemplary embodiments, and FIG. 5 is another illustrative timeline that helps demonstrate the example approach shown in and described in connection with FIGS. 2a-2i. FIG. 4a shows nine elements to be included in an eMenu. Moving from left to right, FIG. 4a shows 1×1, 2×1, 2×1, 1×2, 2×2, 1×2, 2×1, 2×1, and 1×2 items. The red boxes shown in FIG. 5 and in the state object representations represent segment frames. Initially, four cells in the first row are available (the state object is completely empty), so the first elements are taken from the source list while the total width is less than four. Because of the way the loop is structured, the first four elements are taken, as shown in FIG. 4b. The combination shown in FIG. 4b cannot be inserted into the first row, an attempt is made to rotate the elements in order to find a combination that fits, which results in the layout shown in FIG. 4c. This is the end of the first iteration.

At the start of the second iteration, the menu items shown at the left of FIG. 4d remain and the state object is shown at the right of FIG. 4d. Only one cell needs to be filled, so only the item shown in FIG. 4e is retrieved. This element cannot fill one cell, even if rotated. Thus, a search is made to locate suitable elements in the remainder of the list. The second item in the FIG. 4d list can be rotated to fit, so it is placed in the layout. The element shown in FIG. 4e is unused, so it is returned to the beginning of the source list. This is the end of the second iteration.

At the start of the third iteration, the menu items shown at the left of FIG. 4f remain and the state object is shown at the right of FIG. 4f. At this point, three cells in the last row need to be filled. However, the end of the segment frame is about to be reached. Thus, it only is possible to fill the space with a 1×2 item (possibly with a 1×1 items), or with one or more 1×1 items. The second element shown in FIG. 4f is selected, rotated, and inserted. Because there is no possible way to fill in the last cell using the elements remaining, that segment is considered filled. This is the end of the third iteration and the completion of the first segment frame.

In the fourth iteration, a new segment frame is started, and there is a need to fill in its first row. This can be done using the three remaining items, e.g., if they are arranged as shown in FIG. 4g. These elements are added to the layout, and all items have been placed.

Example Input File Format

Structured information regarding the eMenu to be generated may be provided in any suitable form. In certain example embodiments, four tables may be provided, e.g., for identifying categories of products, products, drinks, and filler materials. Such tables may, for instance, be provided in separate flat text files, as multiple worksheets in an Excel Workbook, as multiple tables in an Access or other database, etc.

An example categories table may include a column for the names of the categories. To help maintain some hierarchical information, an optional "parent category" column may be provided. For instance, "wine list," "house," "white," and "red," may be category names. The "wine list" category optionally may be provided as the parent category for each of "house," "white," and "red." Descriptions may be provided for some or all categories. Categories may have images associated with them, and they may be published to an eMenu and/or orderable from an eMenu at certain predefined times. Table 1 below includes entries for an example categories table:

TABLE 1

| Parent Category | Name | Description | Full Image URL | Publish | Order | Start time | End time |
|---|---|---|---|---|---|---|---|
| | Appetizers | | | | | | |
| | Wings | | | | | | |
| | Entrees | | | | | | |
| | Sandwiches | | | | | | |
| | Salads | | | | | | |
| | Classic Burgers | | | | | | |
| | Specialty Burgers | | | | | | |
| | Sides | | | | | | |

TABLE 1-continued

| Parent Category | Name | Description | Full Image URL | Publish | Order | Start time | End time |
|---|---|---|---|---|---|---|---|
| | Sidelines | Substitute one of these items for a small upcharge | | | | | |
| | Soups & Chili | | | | | | |
| | Desserts | | | | | | |
| | Seasonal Menu | | | | | | |
| | Gluten Free | | | | | | |
| | Kids | | | | | | |
| | Signature Cocktails | | | | | | |
| | Classic Cocktails | | | | | | |
| | Beer Cocktails | | | | | | |
| | Bottled Beer | | | | | | |
| | Draft Beer | | | | | | |
| | Wine List | | | | | | |
| Wine List | House | | | | | | |
| Wine List | White | | | | | | |
| Wine List | Red | | | | | | |
| | Sangrias | | | | | | |
| | Margaritas & Frozen Drinks | | | | | | |
| | Non-Alcoholic | | | | | | |

An example products table may include information identifying the name of the product and the category to which the product belongs. An optional description and/or image may be identified, as well. A flag indicating whether the product should be published to the eMenu also may be set. Optionally, inventory or stock may be maintained. This may, for example, help indicate when items should not be published and/or listed as available. An indication whether the product is "on special" or to be featured may also be provided. Optionally, time periods defining specials may be included as well (e.g., designating lunch specials as times during any given day, themed specials as belonging to a season such as the winter holidays or one or more months for March Madness or the like, etc.). Pricing information may also be provided. This may take the form of a main price, and optional pricing schemes (e.g., for full versus half orders, different numbers of items such as wings or the like, etc.). FIG. 6 includes entries for an example products table. The same information may be provided for an example drinks table, e.g., as shown in FIG. 7. In certain exemplary embodiments, the products and drinks tables may be combined.

For filler information, images from a filler table may be used. The filler table may specify the height (in table cells, pixels, or other measure), and identify an image. An example filler table is provided below in Table 2:

TABLE 2

| Width | Height | Image URL |
|---|---|---|
| 1 | 3 | /fillers/2min_gameclock_bw.png |
| 2 | 3 | /fillers/4thQuarter_bw.png |
| 2 | 3 | /fillers/Bottom9th_bw.png |
| 2 | 3 | /fillers/hockey_darkblue_bw.png |

Example Output File Format

Once the placement approach has determined the proper coordinates in the table for each menu item, an output file may be generated. As indicated above, the output file may be based on an underlying schema and may be formatted as an XML document, JSON file, and/or the like. The schema may specify fields for different item types. For instance, for menu items, a size attribute may be defined. Acceptable values may be 1, 2, or 4 (e.g., corresponding to the number of cells occupied by the item). As another example, coordinates may be defined, e.g., identifying the cell in the table, pixel location, or other position, where the top left corner of the element is to be placed, etc. An example JSON file is set forth in the attached Code Appendix.

Figure 8A:
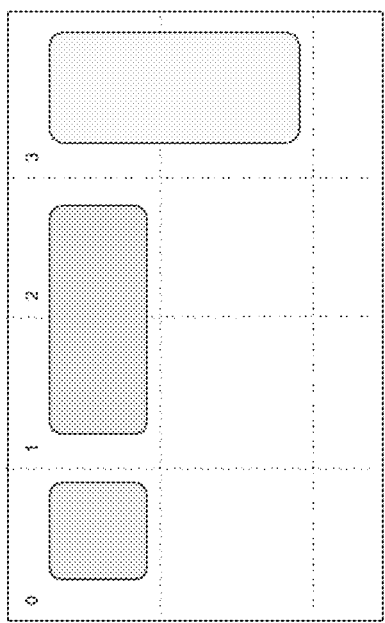
FIGS. 8a-8b schematically show how a schema file may be used to organize elements in accordance with certain exemplary embodiments.
Figure 8B:
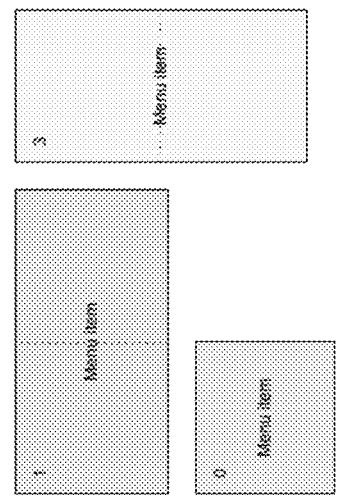

The file may be accessed locally and/or from a network location via an application running on the patron-operated device. For instance, the application may include code for retrieving and parsing the file, and entering the data in a locally stored database, e.g., for possible subsequent local-based reproduction. The database may be read when the eMenu is opened, with the application retrieving information from the database and displaying the eMenu on the patron-operated device. FIGS. 8a-8b schematically show how a schema file may be used to organize elements in accordance with certain exemplary embodiments. More particularly, a schema file may direct the menu items to be displayed in the grid, e.g., as shown in the FIG. 8a example, or the FIG. 8b example, based on retrieved information linking the item numbers to specific coordinates, cells, or the like.

Figure 9:
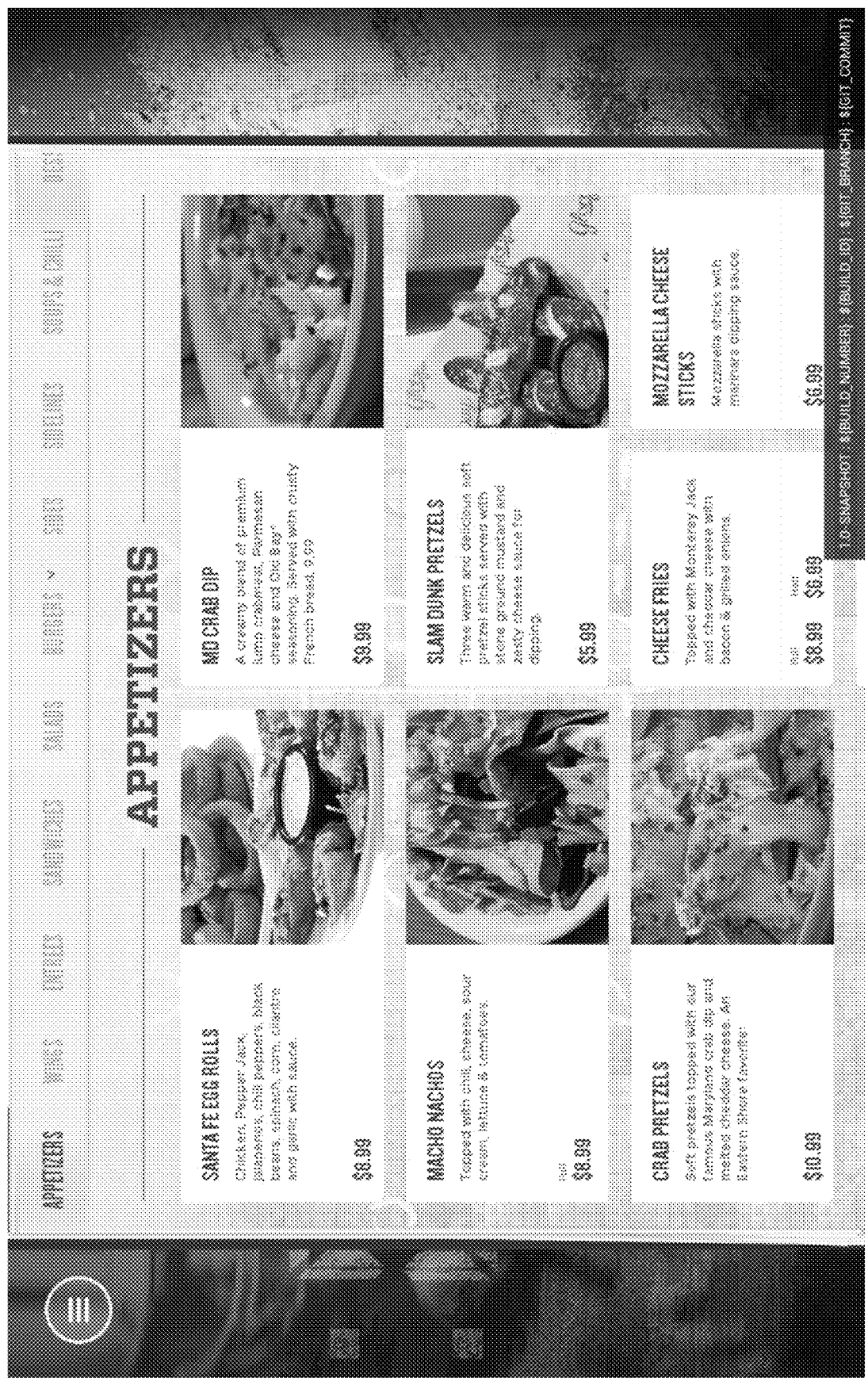
FIG. 9 is an example eMenu made in accordance with certain exemplary embodiments.

FIG. 9 is an example eMenu made in accordance with certain exemplary embodiments. As can be seen from FIG. 9, categories of items are provided as discrete and selectable elements in a horizontal line at the top of the example display. The appetizers menu is selected, and the appetizers category title is shown in large type in the center of the screen. Menu items derived from the products table associated with the appetizers category are displayed in the table-based approach below the appetizers category title. The entry names are shown, together with their descriptions and prices. In the case of the cheese fries appetizer, two pricing models are provided—one for a full order with a first price, and another for a half order with a second price. As can be seen, there are three rows and four columns. The entries in the first two rows are 2×2 entries, with each including a text and an image. There is one 1×2 entry and two 1×1 entries in the last row.

The menu icon in the upper left corner may be used to enable patrons to access other content provided through the device such as, for example, the entertainment offerings noted above.

A user may select an item (e.g., through a touch interface provided by the device), confirm that it should purchased, and add it to an order. In certain example embodiments, coordination may be provided between the users at a given table and/or in a given party. For instance, because each person may be provided with his or her own device, all orders may be added to a single order and synchronized so that the order is placed at once. Similarly, updates may be pushed to a table at a time, e.g., once the order has been entered, prepared, delivered, when the check is ready, etc.

In certain exemplary embodiments, payment may be processed using the techniques set forth in U.S. Application Ser. No. 61/875,195, filed on Sep. 9, 2013, the entire contents of which are hereby incorporated by reference herein.

It will be appreciated that although certain exemplary embodiments involve a row-by-row top-to-bottom approach, the same or similar techniques may be used on a row-by-row bottom-up basis, in a column-by-column left-to-right or right-to-left approach, etc. Similarly, although certain exemplary embodiments involve a left-to-right approach, right-to-left, top-to-bottom, bottom-to-top, and/or the like may be used in different exemplary embodiments.

It is noted that the example algorithms discussed herein are sufficiently generic to accommodate different numbers of columns in a grid, different numbers of cells used by menu items, and/or the like.

In view of the foregoing, it will be appreciated that certain exemplary embodiments provide automated eMenu GUI layout generation. The techniques of certain exemplary embodiments can accommodate dynamic patterns instead of simple repetitions, thereby created interesting visual aesthetic effects suitable for use with an electronic device such as a tablet or the like. The techniques of certain exemplary embodiments additionally or alternatively may provide for a coherent flow and organization of items instead of a more random placement. Thus, certain exemplary embodiments are able to maintain a desired menu item display order with an acceptable amount of deviation in an easy to implement, fast running, flexible and extensible approach.

While the preferred aspects of the invention have been illustrated and described herein, it will be apparent to one of ordinary skill in the art that various changes and/or modifications can be made. Thus, the specific description herein is meant to be exemplary only and is not intended to limit the invention beyond the terms of appended claims.

What is claimed is:

1. A method of formatting an electronic menu to be output to a display of an electronic device, the method comprising:

defining a virtual grid-based layout including rows and columns that together define a plurality of grid cells;

receiving input identifying a plurality of items to be included in the electronic menu, each said item having associated length and width dimensions corresponding to a number of grid cells, at least some of said items being flagged, based upon a respective flag in each said item, for inclusion in the electronic menu;

automatically and programmatically arranging said items flagged for inclusion in the electronic menu in the grid cells of the grid-based layout in a manner that minimizes the number of unused grid cells in the virtual grid-based layout by performing one of:

(A) adding to a source set a representation of each of the items identified by the received input;

defining a state object having a predetermined number of rows and a number of columns equal to the number of columns in the grid-based layout that together define a plurality of state object cells. the state object cells having the same size and shape as the grid cells;

arranging items from the source set in the state object in a row-by-row manner. minimizing the unused cells in each row; and defining the grid-based layout in accordance with the state object;

(B) adding to a source set a representation of each of the items identified by the received input, the elements in the source set being ordered in accordance with a desired display order for the corresponding items;

dividing the grid-based layout into a plurality of segments, each said segment including at least two rows and all columns in these rows that together define segment cells;

arranging items from the source set in a segment-by-segment manner in accordance with respective selected segment layouts; and defining the grid-based layout in accordance with the arranged segments; or (C) adding to a source set a representation of each of the items identified by the received input, the elements in the source set being ordered in accordance with a desired display order for the corresponding items;

dividing the grid-based layout into a plurality of segments, each said segment including a number of rows that is at least one row greater than a maximum size of the elements, as expressed in cells, and all columns in these rows, so that the segment rows and segment columns collectively define segment cells;

arranging items from the source set in the segment cells for each said segment proceeding in order, first attempting reordering and if necessary then rotating elements in the source set; and defining the grid-based layout in accordance with the arranged segments;

storing, to a file on a non-transitory computer readable storage medium, a representation of the layout, following said arranging, the representation of the layout corresponding to the formatted electronic menu; and making the file available to the electronic device in enabling the formatted electronic menu to be displayed on the display of the electronic device.

2. The method of claim 1, wherein the formatted electronic menu includes a hierarchical arrangement of sections and sub-sections.

3. The method of claim 2, wherein items in a sub-section cannot be reordered as a result of the arranging.

4. The method of claim 2, further comprising defining different grid-based layouts for different sections.

5. The method of claim 1, wherein the arranging preserves to the maximum extent possible the order of the items in the received input.

6. The method of claim 1, wherein the received input further provides content information for each said item, the content information including a name, description, and price for the respective item.

7. The method of claim 6, wherein the content information for each said item further includes an optional image field that specifies a location for an image file to be displayed with the respective item.

8. The method of claim 7, wherein one of the length and width dimensions associated with each said item having a valid entry in its optional image field is increased.

9. The method of claim 6, wherein the received input further indicates that at least one of the items is to be displayed as a highlighted feature, the length and width dimensions associated with each said highlighted feature both being increased.

10. The method of claim 1, further comprising:
maintaining an inventory value for at least some of the items;
determining whether an inventory value drops below a predetermined threshold; and
in response to a determination that an inventory value drops below the predetermined threshold, reformatting the electronic menu so as to exclude from the grid-based layout an entry for the associated item.

11. The method of claim 1, further comprising:
for at least some of the items, maintaining a record of a time period over which the respective items are to be offered for inclusion in the electronic menu; and
determining whether a time period has expired; and
in response to a determination that a time period has expired, reformatting the electronic menu so as to exclude from the grid-based layout an entry for the associated item.

12. The method of claim 1, wherein the arranging comprises:
adding to a source set a representation of each of the items identified by the received input;
defining a state object having a predetermined number of rows and a number of columns equal to the number of columns in the grid-based layout that together define a plurality of state object cells, the state object cells having the same size and shape as the grid cells;
(a) determining how many state object cells are unused in the first row of the state object;
(b) removing elements from the source set and adding the removed elements to an insertion set while the total width of the elements added to the insertion set, as measured in cells, is less than the number of unused cells in the first row of the state object;
(c) attempting to reorder the elements in the insertion set to fill the unused cells in the first row of the state object;
(d) in response to a valid order being determined in (c), placing the reordered elements in the state object in this reordered order until all unused cells are filled and returning to the source set in their initial order any unused elements remaining in the insertion set;
(e) in response to no valid order being determined in (c), searching for an appropriately- sized element from among the first predetermined number of elements in the source set;
(f) in response to an appropriately-sized element being found in (e), removing the appropriately-sized element from the source set and adding it to the insertion set, reordering the elements in the insertion set to fill the unused cells in the first row of the state object, and placing the reordered elements in the state object in this reordered order until all unused cells are filled and returning to the source set in their initial order any unused elements remaining in the insertion set; and
(g) if the source set is not empty, designating the row following the first row of the state object as the new first row of the state object and repeating (a)-(f), but otherwise defining the grid-based layout in accordance with the state object.

13. The method of claim 12, further comprising inserting preselected filler material into any unused grid cells.

14. The method of claim 12, wherein the predetermined number of elements searchable in (e) is less than the number of elements in the source set.

15. The method of claim 1, wherein the arranging comprises:
adding to a source set a representation of each of the items identified by the received input, the elements in the source set being ordered in accordance with a desired display order for the corresponding items;
dividing the grid-based layout into a plurality of segments, each said segment including at least two rows and all columns in these rows that together define segment cells;
(a) starting with the first segment, and starting at the beginning of the source set, identifying elements in the source set whose total cell space is less than or equal to the number of cells in the segment, and removing those identified elements from the source set;
(b) selecting a segment layout from a pre-generated set of possible segment layouts for the identified elements, based on the combination of dimensions of the items associated with identified elements, as represented in cells;
(c) laying out the items in the first segment in accordance with the selected segment layout; and
(d) if the source set is not empty, designating the segment following the first segment as the new first segment and repeating (a)-(c), but otherwise defining the grid-based layout in accordance with the laid-out segments.

16. The method of claim 15, wherein there are two rows in each segment.

17. The method of claim 15, wherein the number of rows in each segment is equal to maximum size, in cells, of any item.

18. The method of claim 1, wherein the arranging comprises:
adding to a source set a representation of each of the items identified by the received input, the elements in the source set being ordered in accordance with a desired display order for the corresponding items;
dividing the grid-based layout into a plurality of segments, each said segment including a number of rows that is at least one row greater than a maximum size of the elements, as expressed in cells, and all columns in these rows, so that the segment rows and segment columns collectively define segment cells;
(a) starting with a first segment, determining how many segment cells are unused in its last row and, in response to a determination that there are no unused segment cells in its last row, adding the first segment to the grid-based layout and making the next segment the first segment;
(b) starting with the first segment, and starting at the beginning of the source set, identifying elements in the source set whose total cell space is less than or equal to the number of unused cells in the first row of the first segment, and removing those identified elements from the source set;
(c) attempting to first reorder and if necessary then rotate at least some of the identified elements to fill the unused cells in the first row of the first segment;
(d) in response to a successful attempt in (c), placing the reordered and/or rotated elements in the first segment in this reordered and/or rotated order and returning to the source set in their initial order any unplaced identified elements;

(e) in response to an unsuccessful attempt in (c), searching the source set for an element from among the first predetermined number of elements in the source set that is appropriately-sized and/or re-orientable to be appropriately-sized to fill unused cells in the first row of the first segment;

(f) in response to an appropriately-sized and/or re-orientable element being found in (e), removing the appropriately-sized element from the source set and considering it one of the identified elements, attempting to first reorder and if necessary then rotate at least some of the identified elements to fill the unused cells in the first row of the first segment, placing the reordered and/or rotated elements in the first segment in this reordered and/or rotated order and returning to the source set in their initial order any unplaced identified elements; and (g) if the source set is not empty, designating the row following the first row of the first segment as the new first row of the first segment and repeating (a)-(f), but otherwise defining the grid-based layout in accordance with the first segment.

19. A computing device, comprising:

processing resources including at least one processor and a memory;

a non-transitory computer readable storage medium; and an input channel configured to receive input identifying a plurality of items to be included in an electronic menu, each said item having associated length and width dimensions corresponding to a number of grid cells, at least some of said items being flagged, based upon a respective flag in each said item, for inclusion in the electronic menu;

wherein the processing resources are controllable to format the electronic menu using received input by executing instructions for at least:

defining a virtual grid-based layout including rows and columns that together define a plurality of grid cells;

automatically and programmatically arranging said items flagged for inclusion in the electronic menu in the grid cells of the grid-based layout in a manner that minimizes the number of unused grid cells in the virtual grid-based layoutby performing one of:

(A) adding to a source set a representation of each of the items identified by the received input;

defining a state object having a predetermined number of rows and a number of columns equal to the number of columns in the grid-based layout that together define a plurality of state object cells, the state object cells having the same size and shape as the grid cells;

arranging items from the source set in the state object in a row-by-row manner, minimizing the unused cells in each row; and defining the grid-based layout in accordance with the state object;

(B) adding to a source set a representation of each of the items identified by the received input, the elements in the source set being ordered in accordance with a desired display order for the corresponding items;

dividing the grid-based layout into a plurality of segments, each said segment including at least two rows and all columns in these rows that together define segment cells;

arranging items from the source set in a segment-by-segment manner in accordance with respective selected segment layouts; and defining the grid-based layout in accordance with the arranged segments; or (C) adding to a source set a representation of each of the items identified by the received input, the elements in the source set being ordered in accordance with a desired display order for the corresponding items;

dividing the grid-based layout into a plurality of segments, each said segment including a number of rows that is at least one row greater than a maximum size of the elements, as expressed in cells, and all columns in these rows, so that the segment rows and segment columns collectively define segment cells;

arranging items from the source set in the segment cells for each said segment proceeding in order, first attempting reordering and if necessary then rotating elements in the source set; and defining the grid-based layout in accordance with the arranged segments;

storing, to a file on the non-transitory computer readable storage medium, a representation of the layout, following said arranging, the representation of the layout corresponding to the formatted electronic menu; and making the file available to electronic devices in order to in turn enable the electronic devices to display and enable user interaction with the formatted electronic menu.

20. A non-transitory computer readable storage medium tangibly storing instructions that, when executed, perform the method of claim 1.

* * * * *